US010023180B2

(12) United States Patent
Suenaga et al.

(10) Patent No.: US 10,023,180 B2
(45) Date of Patent: Jul. 17, 2018

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Shinichiro Suenaga, Nagoya (JP); Shinichi Baba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/430,853

(22) Filed: Feb. 13, 2017

(65) Prior Publication Data
US 2017/0240163 A1    Aug. 24, 2017

(30) Foreign Application Priority Data

Feb. 23, 2016  (JP) ................................. 2016-031948

(51) Int. Cl.
| | |
|---|---|
| *B60W 20/30* | (2016.01) |
| *B60W 20/40* | (2016.01) |
| *B60W 10/08* | (2006.01) |
| *B60W 10/115* | (2012.01) |
| *B60K 6/445* | (2007.10) |
| *B60K 6/26* | (2007.10) |
| *B60K 6/365* | (2007.10) |
| *B60W 30/184* | (2012.01) |
| *B60W 20/00* | (2016.01) |

(52) U.S. Cl.
CPC .............. *B60W 20/30* (2013.01); *B60K 6/26* (2013.01); *B60K 6/365* (2013.01); *B60K 6/445* (2013.01); *B60W 10/08* (2013.01); *B60W 10/115* (2013.01); *B60W 20/00* (2013.01); *B60W 20/40* (2013.01); *B60W 30/1843* (2013.01); *B60W 2510/107* (2013.01); *B60Y 2200/92* (2013.01); *Y02T 10/6239* (2013.01); *Y02T 10/7258* (2013.01); *Y10S 903/906* (2013.01); *Y10S 903/911* (2013.01); *Y10S 903/93* (2013.01)

(58) Field of Classification Search
CPC .. B60W 20/30; B60W 20/40; B60W 30/1843; B60W 10/08; B60W 10/115; B60K 6/445; B60K 6/26
USPC ......................................................... 701/22
See application file for complete search history.

(56) References Cited

U.S. PATENT DOCUMENTS

| | | |
|---|---|---|
| 2015/0142232 A1 | 5/2015 | Tabata et al. |
| 2015/0367832 A1 | 12/2015 | Oshiumi |
| 2016/0001764 A1 | 1/2016 | Iwase et al. |

(Continued)

FOREIGN PATENT DOCUMENTS

| | | |
|---|---|---|
| JP | 2016-078551 A | 5/2016 |
| WO | 2013/128587 A1 | 9/2013 |

(Continued)

*Primary Examiner* — Yazan A Soofi
(74) *Attorney, Agent, or Firm* — Oliff PLC (57) ABSTRACT

A control device for a vehicle includes an electronic control unit. The electronic control unit is configured to set a share ratio of driving force of the first electric motor and the second electric motor. The electronic control unit is configured to set the share ratio of the driving force such that when the temperature of a pinion gear in a planetary gear mechanism is higher than a specified temperature, the share ratio of the driving force of the first electric motor is lower than the share ratio when the temperature is lower than the specified temperature.

6 Claims, 9 Drawing Sheets

(56) References Cited

U.S. PATENT DOCUMENTS

| | | | |
|---|---|---|---|
| 2016/0101771 A1* | 4/2016 | Hata | B60K 6/445 701/22 |
| 2016/0176392 A1* | 6/2016 | Murata | B60K 6/445 701/22 |
| 2016/0280215 A1* | 9/2016 | Nishimine | B60W 20/20 |

FOREIGN PATENT DOCUMENTS

| | | |
|---|---|---|
| WO | 2014/091582 A1 | 6/2014 |
| WO | 2014/128925 A1 | 8/2014 |

* cited by examiner

CONTROL DEVICE AND CONTROL METHOD FOR VEHICLE

INCORPORATION BY REFERENCE

The disclosure of Japanese Patent Application No. 2016-031948 filed on Feb. 23, 2016 including the specification, drawings and abstract is incorporated herein by reference in its entirety.

BACKGROUND

1. Technical Field

The present disclosure relates to a control device and a control method for a vehicle that includes an electric motor.

2. Description of Related Art

International Publication No. WO2014/128925 discloses a vehicle including a planetary gear mechanism disposed in a power transmission line, and a first electric motor (for example, a first motor-generator MG1) and a second electric motor (for example, a second motor-generator MG2). The vehicle can travel with driving force of only the second electric motor and travel with driving force of both the first electric motor and the second electric motor. Hereinafter, a mode of driving with the driving force of both the first electric motor and the second electric motor is also referred to as "dual driving."

The vehicle capable of performing dual driving is configured to satisfy requested driving force basically with only the second electric motor (single driving). When the vehicle cannot satisfy the requested driving force only with the driving force (maximum output) output from the second electric motor, the vehicle shifts to the dual driving in which the driving force is output not only from the second electric motor but also from the first electric motor.

SUMMARY

The vehicle capable of performing dual driving is controlled to satisfy the requested driving force with only the second electric motor during the single driving and to compensate a shortage relative to the requested driving force with the first electric motor during the dual driving. Accordingly, even when the requested driving force can be satisfied, there are possibilities that each electric motor operates at an inefficient operating point.

To enhance control flexibility of each electric motor, a share ratio of driving force of the first electric motor with respect to the requested driving force may be increased. Thus, a load of the second electric motor may be reduced. In this case, the share ratio of the driving force (torque) of the first electric motor increases. Accordingly, increase in torque of the first electric motor may cause increase in temperature of a pinion gear (which is hereinafter also referred to as pinion temperature) of the planetary gear mechanism. As a result, the increase in pinion temperature may cause such problems as restriction (prohibition) of the dual driving.

The present disclosure provides a control device and a control method for a vehicle including a planetary gear mechanism, a first electric motor, and a second electric motor, the vehicle being able to perform dual driving to drive both the electric motors for traveling, the control device and the control method being able to set a driving force share ratio between each electric motor with respect to requested driving force such that pinion temperature increase in a pinion gear of the planetary gear mechanism can be suppressed in dual driving.

A first aspect of the present disclosure provides a control device for a vehicle. The vehicle includes a planetary gear mechanism, a first electric motor, and a second electric motor. The planetary gear mechanism includes a sun gear, a ring gear, a pinion gear, and a planetary carrier. The planetary gear mechanism is disposed in a power transmission line. The planetary gear mechanism is coupled with the first electric motor. The vehicle is configured to execute traveling with driving force of only the second electric motor and traveling with driving force of both the first electric motor and the second electric motor. The control device includes an electronic control unit. The electronic control unit is configured to: estimate pinion temperature of the pinion gear; set a share ratio between each driving force of the first electric motor and the second electric motor with respect to requested driving force of the vehicle; and set the share ratio of the driving force of the first electric motor such that the share ratio of the driving force of the first electric motor when the estimated pinion temperature is higher than a specified temperature is lower than the share ratio of the driving force of the first electric motor when the pinion temperature is equal to or below the specified temperature.

A second aspect of the present disclosure provides a control device for a vehicle. The vehicle includes a planetary gear mechanism, a first electric motor, and a second electric motor. The planetary gear mechanism includes a sun gear, a ring gear, a pinion gear, and a planetary carrier. The planetary gear mechanism is disposed in a power transmission line. The planetary gear mechanism is coupled with the first electric motor. The vehicle is configured to execute traveling with driving force of only the second electric motor and traveling with driving force of both the first electric motor and the second electric motor. The control device includes an electronic control unit. The electronic control unit is configured to: estimate pinion temperature of the pinion gear; set a share ratio between each driving force of the first electric motor and the second electric motor with respect to requested driving force of the vehicle; and set the share ratio of the driving force such that when the estimated pinion temperature is higher than a specified temperature, a range of the requested driving force that causes output of the driving force by the first electric motor is narrower than the range of the requested driving force when the pinion temperature is equal to or below the specified temperature.

A third aspect of the present disclosure provides a control method for a vehicle. The vehicle includes a planetary gear mechanism, a first electric motor, a second electric motor, and an electronic control unit. The planetary gear mechanism includes a sun gear, a ring gear, a pinion gear, and a planetary carrier. The planetary gear mechanism is disposed in a power transmission line. The planetary gear mechanism is coupled with the first electric motor. The vehicle is configured to execute traveling with driving force of only the second electric motor and traveling with the driving force of both the first electric motor and the second electric motor. The control method includes: estimating, by the electronic control unit, pinion temperature of the pinion gear; setting, by the electronic control unit, a share ratio between each driving force of the first electric motor and the second electric motor with respect to requested driving force of the vehicle; and setting, by the electronic control unit, the share ratio of the driving force of the first electric motor such that the share ratio of the driving force of the first motor when the estimated pinion temperature is higher than a specified temperature is lower than the share ratio of the driving force of the first motor when the pinion temperature is equal to or below the specified temperature.

A fourth aspect of the present disclosure provides a control method for a vehicle. The vehicle includes a planetary gear mechanism, a first electric motor, a second electric motor, and an electronic control unit. The planetary gear mechanism includes a sun gear, a ring gear, a pinion gear, and a planetary carrier. The planetary gear mechanism is disposed in a power transmission line. The planetary gear mechanism is coupled with the first electric motor. The vehicle is configured to execute traveling with driving force of only the second electric motor and traveling with the driving force of both the first electric motor and the second electric motor. The control method includes: estimating, by the electronic control unit, pinion temperature of the pinion gear; setting, by the electronic control unit, a share ratio between each driving force of the first electric motor and the second electric motor with respect to requested driving force of the vehicle; and setting, by the electronic control unit, the share ratio of the driving force such that when the estimated pinion temperature is higher than a specified temperature, a range of the requested driving force that causes output of the driving force by the first electric motor is narrower than the range of the requested driving force when the pinion temperature is equal to or below the specified temperature.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments of the present disclosure will be described hereinbelow with reference to the drawings.

First, the vehicle incorporating the control device according to the present embodiment will be described with reference to FIG. 1.

Figure 1:
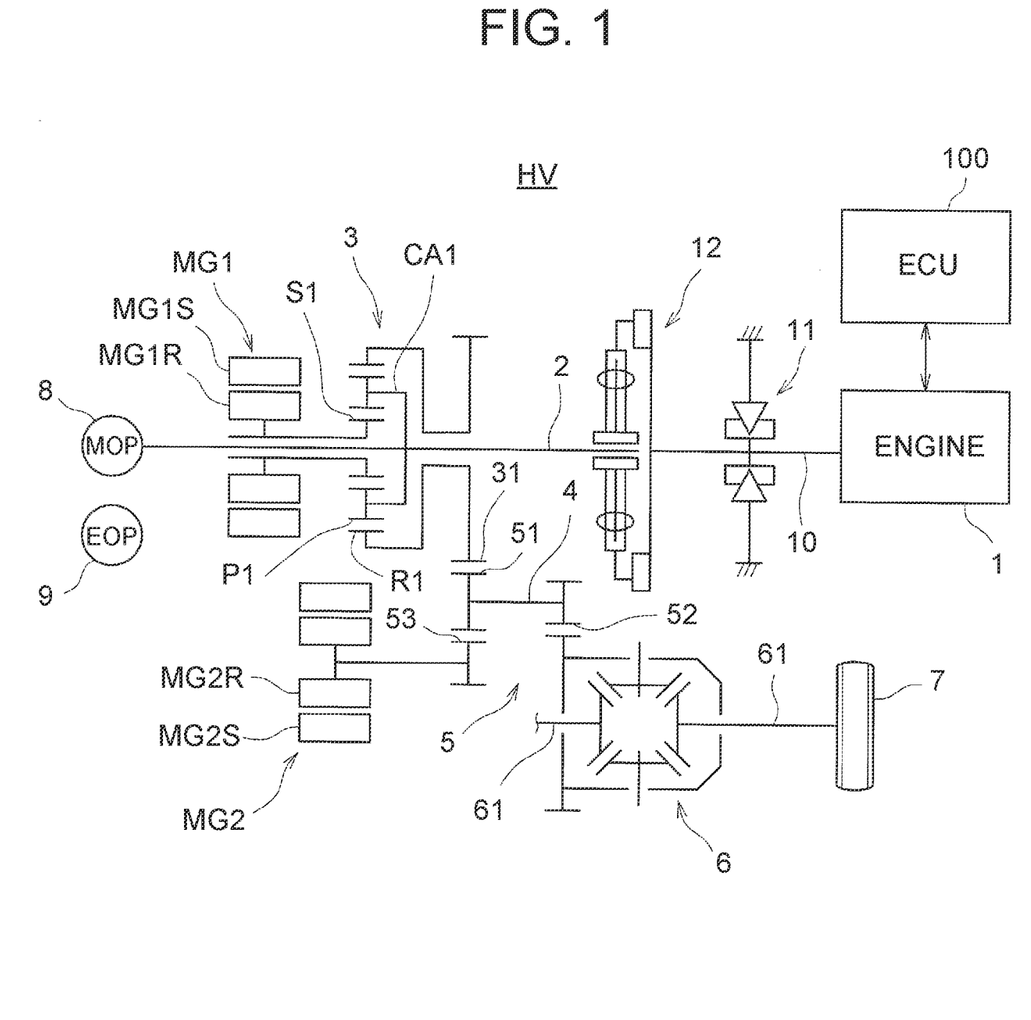
FIG. 1 is a schematic configuration view illustrating a vehicle incorporating a control device according to an embodiment.

The vehicle HV illustrated in FIG. 1 is a hybrid vehicle (for example, a plug-in hybrid vehicle) of a front-engine front-drive (FF) type. The vehicle HV includes an engine (internal combustion engine) 1 configured to generate driving force for traveling, a one-way clutch 11, a damper 12, an input shaft 2, a first motor-generator MG1, a second motor-generator MG2, a planetary gear mechanism 3 functioning as a drive division mechanism, a counter shaft 4, a gear mechanism 5, a differential device 6, right and left drive shafts 61, right and left driving wheels (front wheels) 7, right and left driven wheels (rear wheels, not illustrated), a mechanical oil pump (MOP) 8, an electric oil pump (EOP) 9, and an electronic control unit (ECU) 100.

In the vehicle HV of this example, an input shaft 2 serving as a rotating shaft of the first motor-generator MG1 and a rotating shaft of the second motor-generator MG2 are disposed on different axes.

The ECU 100 is constituted of, for example, a hybrid (HV) ECU, an engine ECU, an MG_ECU, and a battery ECU, and these ECUs are communicably connected to each other. The electric control units such as the HV ECU, the engine ECU, the MG_ECU, and the battery ECU may be configured as individual units.

Now, a description is hereinbelow given of each units such as the engine 1, the one-way clutch 11, the motor-generators MG1, MG2, the planetary gear mechanism 3, the gear mechanism 5, and the ECU 100.

The engine 1 is a power unit, such as a gasoline engine and a diesel engine, configured to combust fuel and output motive power. For example, the engine 1 is configured to be able to control an operating state, such as a throttle opening angle (intake air volume) of a throttle valve provided in an intake passage, a fuel injection amount, and ignition timing. The operating state of the engine 1 is controlled by the ECU 100. The ECU 100 is configured to execute various control of the engine 1 including intake air volume control, injection amount control, and ignition timing control described above.

The engine 1 has a crank position sensor 101 (see FIG. 2) disposed to detect a rotation angle (crank angle) of a crankshaft 10 serving as an output shaft. An output signal of the crank position sensor 101 is input into the ECU 100. A crank angle and an engine speed (number of rotations) can be obtained from the output signal of the crank position sensor 101.

The output of the engine 1 is transmitted to the input shaft 2 through the crankshaft 10 and the damper 12. The damper 12 is, for example, a coil spring-type transaxle damper that absorbs torque variation of the engine 1.

An end portion of the input shaft 2 on the opposite side of the engine 1 is coupled with the mechanical oil pump 8. The mechanical oil pump 8 is driven by the engine 1 to generate hydraulic pressure for control and hydraulic pressure for lubrication/cooling. The vehicle HV of the present embodiment includes the electric oil pump 9. The electric oil pump 9 is provided to secure the hydraulic pressure for control and for lubrication/cooling when the engine 1 stops.

The one-way clutch 11 is provided in the crankshaft 10 of the engine 1. The one-way clutch 11 is a device configured to restrict rotation of the engine 1. That is, the one-way clutch 11 permits rotation of the crankshaft 10 in a positive direction and restricts rotation in a negative direction (reverse rotation of the engine 1), the positive direction being a rotation direction of the crankshaft 10 when the engine 1 is operated.

The first motor-generator MG1 is an AC synchronous generator including a rotor MG1R and a stator MG1S. The rotor MG1R is made of a permanent magnet that is supported rotatably in relation to the input shaft 2. The stator MG1S has a three-phase winding wound around the stator MG1S. The first motor-generator MG1 functions not only as a power generator but also as an electric motor. The first motor-generator MG1 is configured to be a driving source that generates the driving force for traveling. The second motor-generator MG2 is also an AC synchronous generator including a rotor MG2R made of a permanent magnet and a stator MG2S having a three-phase winding wound therearound. The second motor-generator MG2 also functions as an electric motor as well as a power generator. The second motor-generator MG2 is configured to be a driving source that generates the driving force for traveling.

The first motor-generator MG1 is one example of "the first electric motor." The second motor-generator MG2 is one example of "the second electric motor."

Figure 2:
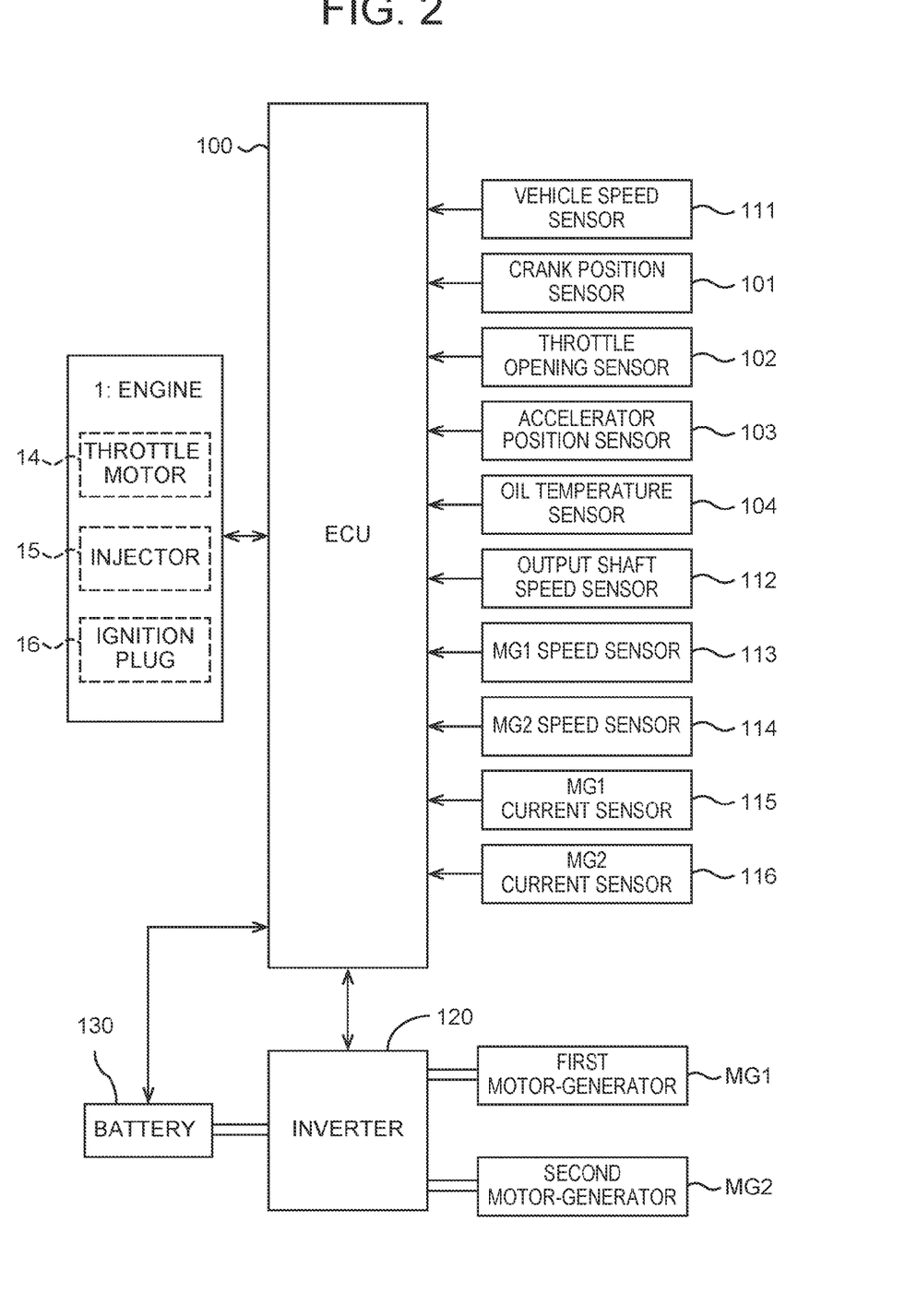
FIG. 2 is a block diagram illustrating the configuration of a control system such as an ECU.

The first motor-generator MG1 is equipped with an MG1 speed sensor (resolver) 113 (see FIG. 2). The second motor-generator MG2 is equipped with an MG2 speed sensor (resolver) 114 (see FIG. 2). The MG1 speed sensor 113 detects rotation angle (speed) of rotor MG1R (the electric motor rotating shaft). The second motor-generator MG2 detects rotation angle (speed) of rotor MG2R (the electric motor rotating shaft). Each output signal (detected speed) of these speed sensors 113,114 is input into the ECU 100 and used for operation such as drive control of the motor-generators MG1, MG2. The motor-generators MG1, MG2 are equipped with an MG1 current sensor 115 and an MG2 current sensor 116 (see FIG. 2) that detect phase currents, respectively. Each output signal (current detection values) of these current sensors 115,116 is also input into the ECU 100.

As illustrated in FIG. 2, the first motor-generator MG1 and the second motor-generator MG2 are each connected to a battery (electric storage device) 130 through an inverter 120. The inverter 120 is controlled by the ECU 100, and regeneration or powering of the respective motor-generators MG1, MG2 is set by controlling the inverter 120. Regenerative electric power generated by regeneration is stored in the battery 130 through the inverter 120. The electric power used for driving each of the motor-generators MG1, MG2 is supplied from the battery 130 through the inverter 120.

As illustrated in FIG. 1, the planetary gear mechanism 3 includes a sun gear S1, a pinion gear P1, a ring gear R1, a planetary carrier CA1. The sun gear S1 is an external gear that rotates on its axis at the center of a plurality of gear elements. The pinion gear P1 is an external gear that circumscribes the sun gear S1 and revolves around the sun gear S1 while rotating on its axis. The ring gear R1 is an internal gear formed into a hollow annular shape so as to gear with the pinion gear P1. The planetary carrier CA1 is configured to support the pinion gear P1 while rotating on its axis through revolution of the pinion gear P1.

The planetary carrier CA1 is coupled with the input shaft 2 in an integrally rotatable manner. The sun gear S1 is coupled with the rotor MG1R of the first motor-generator MG1 in the integrally rotatable manner. The ring gear R1 is coupled with a counter drive gear 31 in the integrally rotatable manner. The counter drive gear 31 is coupled with the drive shafts 61 and the driving wheels 7 through a counter driven gear 51, the counter shaft 4, a final gear 52, and the differential device 6 of the gear mechanism 5 described later.

In the planetary gear mechanism 3, when a torque by the first motor-generator MG1 is input into the sun gear S1 as a reaction torque against an output torque of the engine 1 input into the planetary carrier CA1, a torque larger than the torque input from the engine 1 appears in the ring gear R1 that is an output element. In this case, the first motor-generator MG1 functions as a power generator. When the first motor-generator MG1 functions as a power generator, the driving force of the engine 1 input from the planetary carrier CA1 is distributed to the sun gear S1 side and the ring gear R1 side in accordance with a gear ratio between the sun gear S1 and the ring gear R1.

When the engine 1 is started, the first motor-generator MG1 functions as an electric motor (starter motor), and the driving force of the first motor-generator MG1 is given to the crankshaft 10 through the sun gear S1 and the planetary carrier CA1, so that the engine 1 is cranked. When the engine is started during EV traveling, a torque output by the second motor-generator MG2 is used as a reaction torque against the driving force (output torque) of the first motor-generator MG1.

As described later, the first motor-generator MG1 can output driving force when dual driving is performed during EV traveling.

The gear mechanism 5 includes the counter driven gear 51 and the final gear 52 that are provided in the counter shaft 4 in the integrally rotatable manner. The gear mechanism 5 also includes a reduction gear 53 that gears with the counter driven gear 51. The reduction gear 53 is coupled with the rotor MG2R of the second motor-generator MG2 in the integrally rotatable manner. Accordingly, the driving force output by the second motor-generator MG2 is transmitted to the drive shafts 61 and the driving wheels 7 through the reduction gear 53, the counter driven gear 51, the counter shaft 4, the final gear 52, and the differential device 6.

The thus-described component members such as the motor-generators MG1, MG2, the planetary gear mechanism 3, the gear mechanism 5, and the differential device 6 constitute a transaxle.

The ECU 100 includes a central processing unit (CPU), a read only memory (ROM), a random access memory (RAM), and a backup RAM.

The ROM stores data such as various control programs and maps referred to when the various control programs are executed. The CPU executes arithmetic processing based on data such as the various control programs and the maps stored in the ROM. The RAM is a memory that temporarily stores data such as results of calculation performed in the CPU and data input from each sensor. The backup RAM is a nonvolatile memory that stores data such as data to be saved at occasions such as when the engine 1 is stopped.

As illustrated in FIG. 2, the ECU 100 is connected to various kinds of sensors such as a crank position sensor 101, a throttle opening sensor 102, an accelerator position sensor 103, an oil temperature sensor 104, a vehicle speed sensor 111, an output shaft speed sensor 112, an MG1 speed sensor 113, an MG2 speed sensor 114, an MG1 current sensor 115, and an MG2 current sensor 116. The throttle opening sensor 102 detects the opening of the throttle valve. The accelerator position sensor 103 detects the position of the accelerator pedal. The oil temperature sensor 104 detects the temperature (oil temperature) of hydraulic fluid (hydraulic fluid for control and lubrication (cooling)) in the transaxle. The vehicle speed sensor 111 outputs a signal corresponding to the vehicle speed of the vehicle HV. The output shaft speed sensor 112 detects the speed of the counter driven gear 51 (counter shaft 4). Signals from each of these sensors and switches are input into the ECU 100.

The ECU 100 is connected to a throttle motor 14 that performs open-close driving of the throttle valve of the engine 1, an injector 15, an ignition plug 16 (igniter), and the like.

Based on the output signals of the above-stated various sensors, the ECU 100 executes various control of the engine 1 including opening control of the throttle valve of the engine 1 (intake air volume control (drive control of the throttle motor 14)), fuel injection amount control (opening-closing control of the injector 15), and ignition timing control (drive control of the ignition plug 16).

The ECU 100 calculates requested driving force based on, for example, an accelerator position obtained from the output signal of the accelerator position sensor 103 and a vehicle speed obtained from the output signal of the vehicle speed sensor 111, with reference to a map (arithmetic expressions) and the like. To obtain requested driving force, the ECU 100 controls driving force output by the engine 1, driving force output by the first motor-generator MG1 (which is hereinafter also referred to as MG1 driving force), and driving force output by the second motor-generator MG2 (which is hereinafter also referred to as MG2 driving force).

The ECU 100 further executes operation such as travel mode control, pinion temperature estimation, and control of setting a share ratio of driving force as described later.

The travel mode control is described with reference to FIGS. 1, 3 and 4.

In the present embodiment, hybrid traveling (HV traveling) or EV traveling is selectively executable. Control of the HV traveling and the EV traveling (travel mode control) is executed by the ECU 100.

The HV traveling is a travel mode in which the vehicle HV travel with the engine 1 as a power source. In the HV traveling, the second motor-generator MG2 may be added to the engine 1 as a driving source for traveling. In the HV traveling, the first motor-generator MG1 outputs a reaction torque to function as a reaction receiver relative to the driving force (torque) of the engine 1. Accordingly, the driving force of the engine 1 is output from the ring gear R1 of the planetary gear mechanism 3, and is transmitted to the drive shafts 61 and the driving wheels 7 through the counter drive gear 31, the counter driven gear 51, the counter shaft 4, the final gear 52, and the differential device 6.

The EV traveling is a travel mode for traveling with the first motor-generator MG1 and the second motor-generator MG2 as a power source. In the EV traveling, the vehicle travels while the engine 1 is stopped.

In the present embodiment, the travel mode of the EV traveling includes a single-drive travel mode in which the vehicle HV is made to travel with only the second motor-generator MG2 as a single driving source, and a dual-drive travel mode in which the vehicle HV is traveled with both the second motor-generator MG2 and the first motor-generator MG1 as a driving source.

Figure 3:
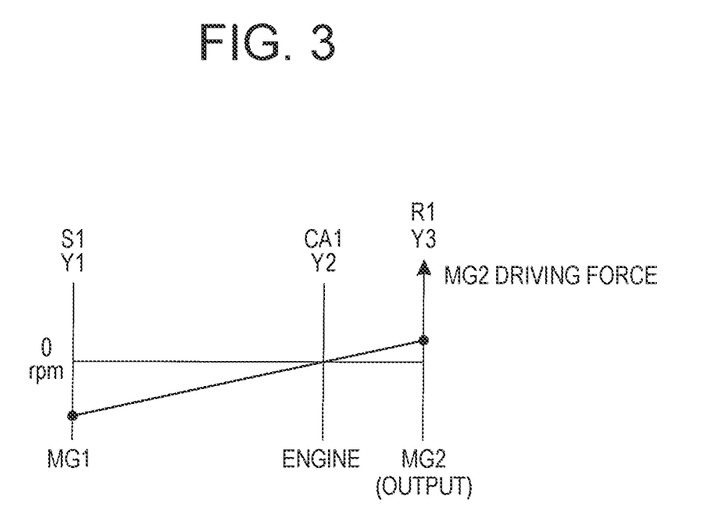
FIG. 3 is a nomogram during a single-drive travel mode.
Figure 4:
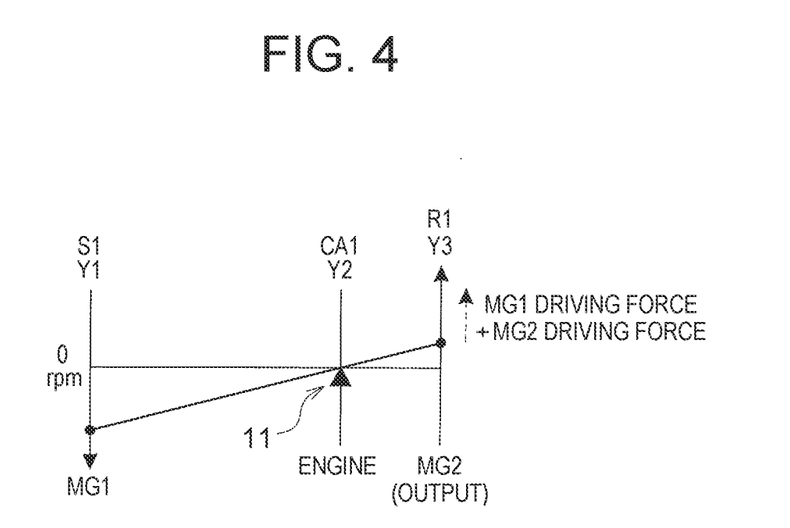
FIG. 4 is a nomogram during a dual-drive travel mode.

FIGS. 3 and 4 are a nomogram chart during the single-drive travel mode and a nomogram during the dual-drive travel mode, respectively. In each nomogram of FIGS. 3 and 4, a vertical axis Y1, a vertical axis Y2, and a vertical axis Y3 are axes indicating the speed of the sun gear S1 (MG1), the speed of the planetary carrier CA1 (engine 1), and the speed of the ring gear R1 (MG2: output), respectively.

As illustrated in FIG. 3, in the single-drive travel mode, the speed (the number of rotations) of the planetary carrier CA1 and the engine 1 is zero, and the requested driving force is obtained by using the driving force of only the second motor-generator MG2. In the single-drive travel mode, the one-way clutch 11 may be in an engaged state or in a disengaged state.

As illustrated in FIG. 4, in the dual-drive travel mode, negative driving force (negative torque) is output from the first motor-generator MG1, so that the one-way clutch 11 is engaged and the driving force of the first motor-generator MG1 is output from the ring gear R1. As a result, the requested driving force is obtained by using the driving force of both the first motor-generator MG1 and the second motor-generator MG2 in the dual-drive travel mode. A share ratio between the driving force of the first motor-generator MG1 (hereinafter also referred to as MG1 driving force) and the driving force of the second motor-generator MG2 (hereinafter also referred to as MG2 driving force) in the dual-drive travel mode will be described later.

During the dual-drive travel mode, the driving force (MG1 torque) output by the first motor-generator MG1 is transmitted to the pinion gear P1 of the planetary gear mechanism 3. Therefore, as the MG1 torque is larger, the temperature of the pinion gear P1 tends to become higher (see FIG. 10).

The ECU 100 estimates the temperature (pinion temperature) of the pinion gear P1 (including a pinion pin) of the planetary gear mechanism 3. Processing of pinion temperature estimation executed by the ECU 100 will be described.

The pinion temperature is estimated based on the number of rotations Npin of the pinion gear P1, the torque (MG1 torque) of the first motor-generator MG1, and the like.

The number of rotations Npin of the pinion gear P1 is calculated by multiplying a difference between the number of rotations of the ring gear R1 and the number of rotations of the planetary carrier CA1 by a gear ratio between the ring gear R1 and the pinion gear P1 (a ratio between the number of teeth of the ring gear R1 and the number of teeth of the pinion gear P1). Here, the number of rotations of the ring gear R1 is calculated based on the number of rotations (number of rotations of the counter driven gear 51) detected with the output shaft speed sensor 112, and a gear ratio between the counter driven gear 51 and the counter drive gear 31 (a ratio between the number of teeth of the counter driven gear 51 and the number of teeth of the counter drive gear 31). Since the planetary carrier CA1 is coupled with the crankshaft 10 of the engine 1, the number of rotations of the planetary carrier CA1 is regarded as the engine speed detected by the crank position sensor 101.

The torque (MG1 torque) of the first motor-generator MG1 is calculated based on the speed (speed of the MG1) detected by the MG1 speed sensor 113 and a current value detected by the MG1 current sensor 115.

Figure 5:
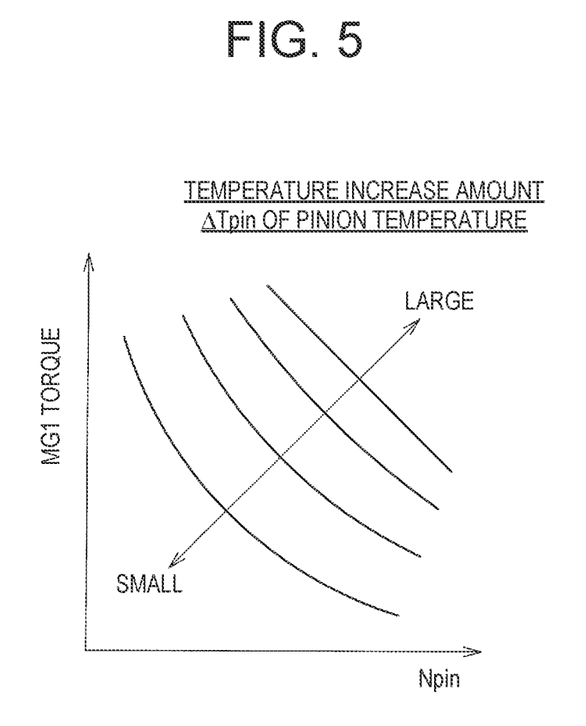
FIG. 5 illustrates a map for calculating a temperature increase amount of pinion temperature.

Based on the number of rotations Npin of the pinion gear P1 and the torque (MG1 torque) of the first motor-generator MG1 obtained in the above processing, a temperature increase amount ΔTpin (° C.) of the pinion temperature is obtained with reference to the map of FIG. 5. A current oil temperature Toil (° C.) is obtained from the output signal of the oil temperature sensor 104. A margin value α is added to the oil temperature Toil to obtain a pinion temperature initial value (Toil+α), and the pinion temperature increase amount αTpin is added to the pinion temperature initial value to obtain a value (pinion temperature initial value+αTpin) as the pinion temperature (estimated temperature).

Figure 6:
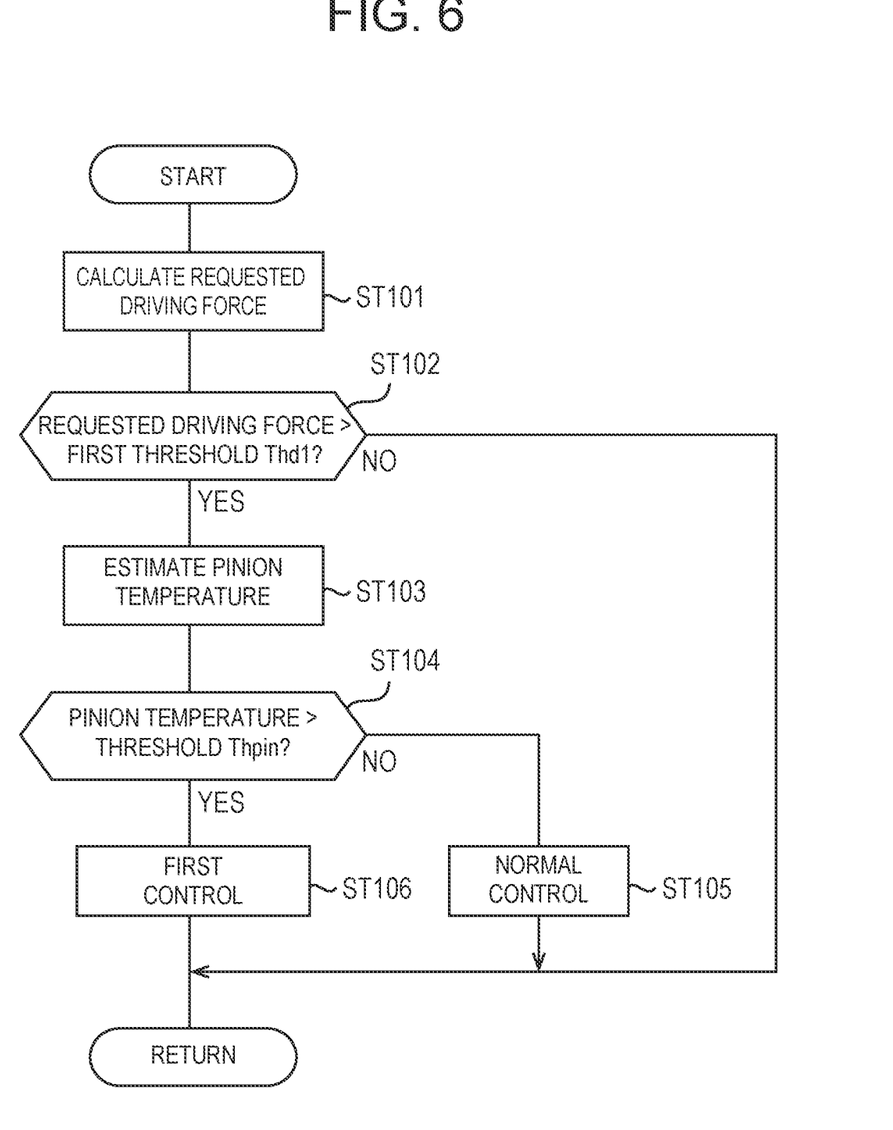
FIG. 6 is a flowchart illustrating one example of setting control of a driving force share ratio.

A description is now given of one example of first control that is the control of setting the share ratio of the driving force with reference to the flowchart of FIG. 6, the first control being executed by the ECU 100 during EV traveling. The control routine of FIG. 6 is executed in the ECU 100.

In the following description, traveling and driving of the vehicle HV with only the second motor-generator MG2 may be referred to as single driving (or MG2 single driving). Traveling and driving of the vehicle HV with both the first motor-generator MG1 and the second motor-generator MG2 may be referred to as dual driving.

When the control routine of FIG. 6 is started, the requested driving force is calculated first in step ST101. Specifically, the requested driving force is calculated based on an accelerator position obtained from the output signal of the accelerator position sensor 103 and a vehicle speed obtained from the output signal of the vehicle speed sensor 111 with reference to a map (arithmetic expressions) and the like.

In step ST102, it is determined whether or not the requested driving force calculated in step ST101 exceeds a first threshold Thd1. When the determination result is negative (NO) (when requested driving force≤Thd1), the processing is returned. When the determination result of step ST102 is negative (NO), the vehicle HV is made to travel by the single driving (MG2 single driving) with the driving force of the second motor-generator MG2.

When the determination result of step ST102 is positive (YES) (when the requested driving force >Thd1), the processing proceeds to step ST103.

Figure 7:
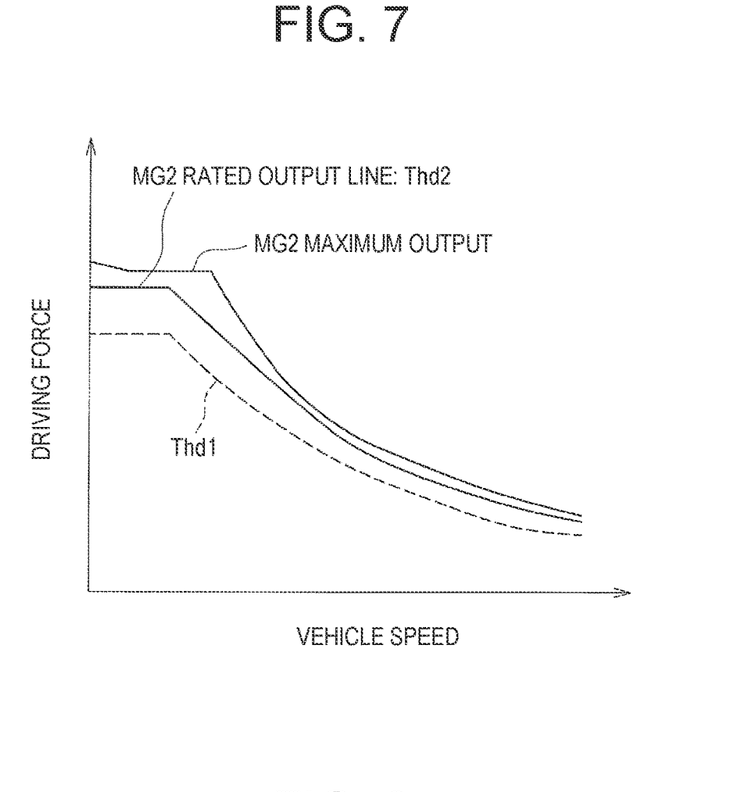
FIG. 7 illustrates an MG2 maximum output (maximum driving force), an MG2 rated output line (second threshold Thd2), and a first threshold Thd1.

Here, the first threshold Thd1 (one example of "the first specified value") used for determination processing of step ST102 is a threshold for determining to switch between a single-driving region (MG2 single-driving region) and a dual-driving region during EV traveling. When the requested driving force exceeds the first threshold Thd1, it is determined that a driving region in the EV traveling enters into a region of dual-driving by the first motor-generator MG1 and the second motor-generator MG2. As illustrated in FIG. 7, the first threshold Thd1 is a value smaller than a maximum output (maximum driving force) of the second motor-generator MG2 and smaller by a specified amount than an MG2 rated output line of the second motor-generator MG2. The first threshold Thd1 is set in accordance with the vehicle speed.

In step ST103, the pinion temperature is estimated by the above-stated pinion temperature estimation processing based on each output signal of the sensors, such as the MG1 speed sensor 113, the MG1 current sensor 115, and the oil temperature sensor 104.

In step ST104, it is determined whether or not the pinion temperature estimated in step ST103 is higher than a specified threshold Thpin. When the determination result of step ST103 is negative (NO) (when pinion temperature≤Thpin), the processing proceeds to step ST105. The threshold Thpin (one example of "the specified temperature") used for the determination processing of step ST104 is a value obtained by, for example, multiplying an upper limit of the temperature that can provide durability or the like of the pinion gear P1 (dual-driving upper limit temperature) by a specified safety factor.

In step ST105, control (hereinafter also referred to as normal control) of setting a normal driving force share ratio is executed. Hereinafter, the normal control is described with reference to FIG. 8.

Figure 8:
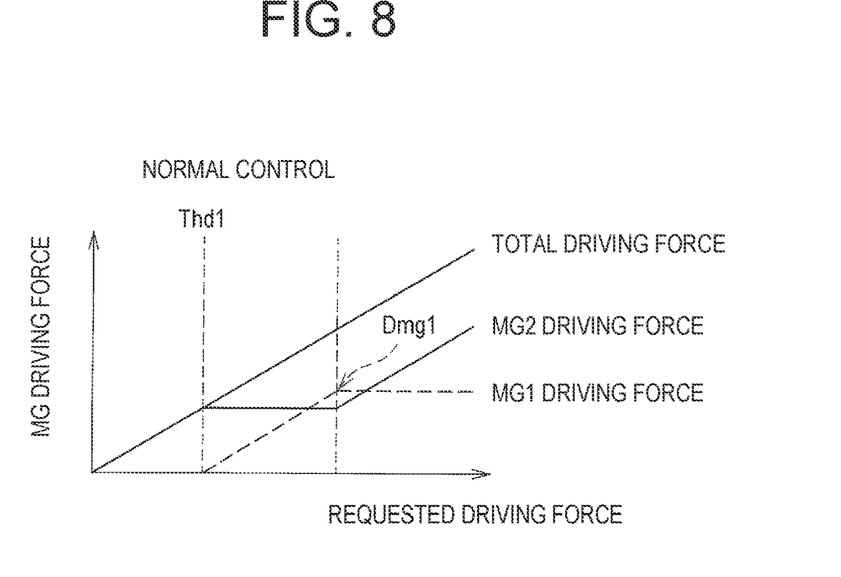
FIG. 8 illustrates a driving force share ratio between MG1 driving force and MG2 driving force in normal control.

First, the driving region is within the single-driving region and the share ratio of the MG1 driving force is zero until the requested driving force reaches the first threshold Thd1. In the normal control, as illustrated in FIG. 8, when the requested driving force exceeds the first threshold Thd1, the share ratio of the MG1 driving force is increased from zero. An increase gradient of the MG1 driving force is set identical to an increase gradient of the requested driving force, and the MG2 driving force is set constant during increase in the MG1 driving force. When the MG1 driving force reaches a specified value Dmg1 (for example, an MG1 rated output line), the MG1 driving force is set constant and the share ratio of the MG2 driving force is increased in accordance with increase in the requested driving force.

Thus, in the normal control, before the MG2 driving force becomes a maximum value (when the requested driving force exceeds the first threshold Thd1 that is smaller than the maximum driving force of the second motor-generator MG2), the single driving is shifted to the dual driving performed by the first motor-generator MG1 and the second motor-generator MG2. Accordingly, the control flexibility of the first motor-generator MG1 and the second motor-generator MG2 is enhanced. As a result, it becomes possible to further enhance the system efficiency. It also becomes possible to execute control so as to enhance drivability and NV characteristics.

When the determination result of step ST104 is positive (YES) (when the pinion temperature is higher than the threshold Thpin), the processing proceeds to step ST106.

In step ST106, the ECU 100 executes first control to set the share ratio of the driving force such that increase in the pinion temperature is suppressed. Hereinafter, the first control is described with reference to FIG. 9.

Figure 9:
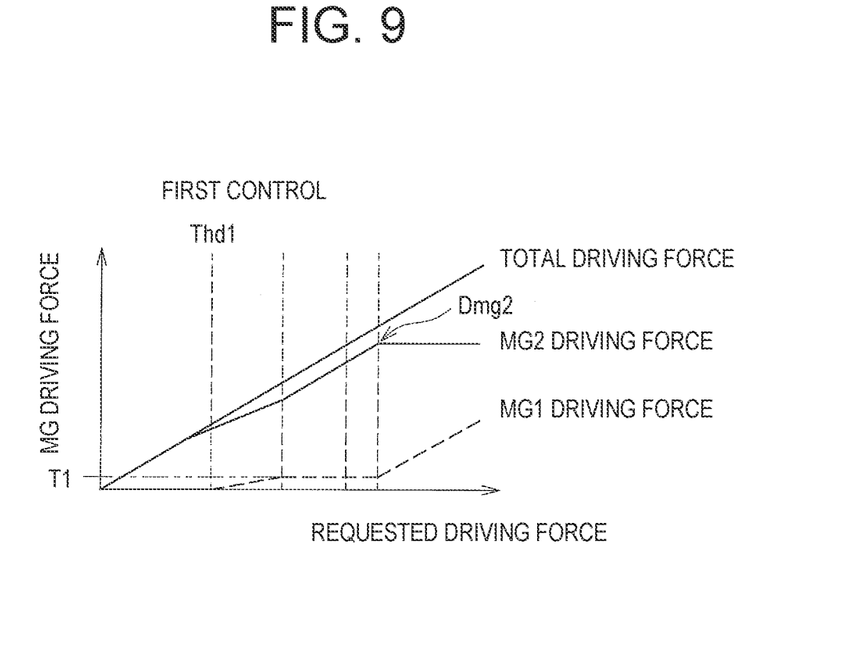
FIG. 9 illustrates a driving force share ratio between MG1 driving force and MG2 driving force in first control.

As illustrated in FIG. 9, also in the first control, the share ratio of the MG1 driving force is increased from zero when the requested driving force exceeds the first threshold Thd1. Up to the range where the requested driving force is not very large, the share ratio of the MG1 driving force in the first control is set within the region where sensitivity of the pinion temperature increase relative to the MG1 torque is low.

Figure 10:
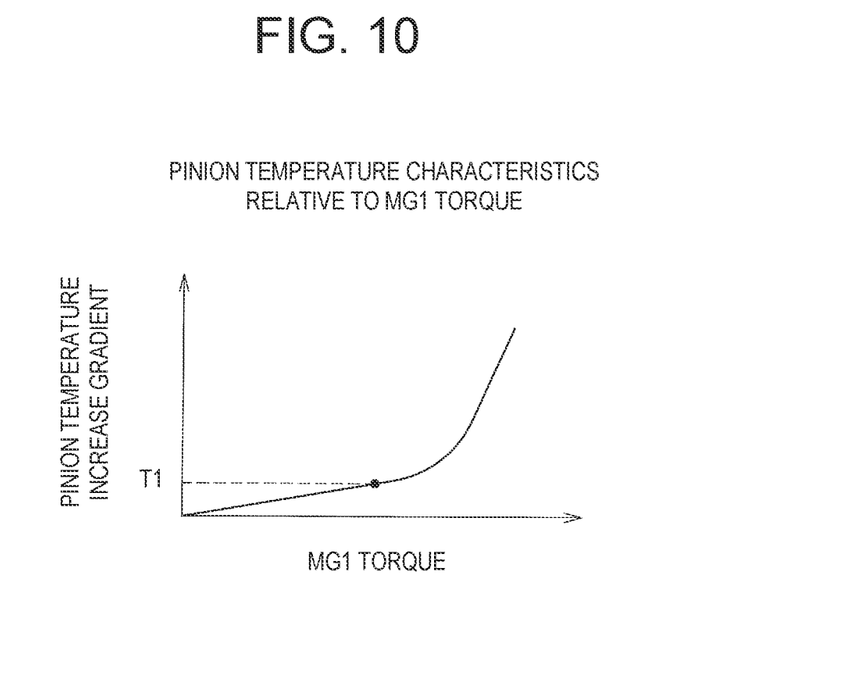
FIG. 10 is a graph view illustrating relation between MG1 torque and pinion temperature increase gradient.

Specifically, the increase gradient in the pinion temperature has relation with the MG1 torque as illustrated in FIG. 10. That is, the pinion temperature has temperature characteristics in which the increase gradient in the pinion temperature is small in a region (a region corresponding to T1 or below) where the MG1 torque is relatively small. Accordingly, the MG1 driving force (torque) to be output is limited to be in the MG1 torque region T1 where the pinion temperature increase gradient is small (see FIG. 9). Thus, the share ratio of the MG1 driving force to the requested driving force is set smaller than that in the normal control. When the requested driving force becomes larger in the state where the share ratio of the MG1 driving force is low (the state where the MG1 torque is limited to the region T1 or below in FIG. 9), the share ratio of the MG2 driving force is increased in connection thereto. When the MG2 driving force reaches a maximum output (maximum driving force) Dmg2 of the second motor-generator MG2, the MG2 driving force is set constant, and the share ratio of the MG1 driving force is increased in accordance with increase in the requested driving force.

As described in the foregoing, according to the first control of the present embodiment, when the pinion temperature (estimated temperature) is high (when the pinion temperature is higher than the threshold Thpin), the share ratio of the MG1 driving force is controlled to be lower than the share ratio when the pinion temperature is low (when the pinion temperature is equal to or below Thpin). This makes it possible to suppress increase in the pinion temperature and to reduce the possibility that the dual driving by the first motor-generator MG1 and the second motor-generator MG2 is restricted (prohibited). In addition, since the share ratio of the MG1 driving force is set in consideration of the pinion temperature characteristics relative to the MG1 torque (see FIG. 10), increase in the pinion temperature can be suppressed more effectively.

Furthermore, when the requested driving force exceeds the first threshold Thd1, the MG1 driving force is output within the region T1 where the increase gradient in the pinion temperature is small. Accordingly, backlash reduction in gears and the like can be performed with output of the MG1 driving force within the region T1. As a result, it becomes possible to suppress inconvenience such as occurrence of shock and generation of tooth hit noise at the time of shifting from the single driving to the dual driving.

When steps ST102 to step ST106 of FIG. 6 are executed by the ECU 100, estimation of the pinion temperature and setting of the share ratio of the driving force are executed.

Figure 11:
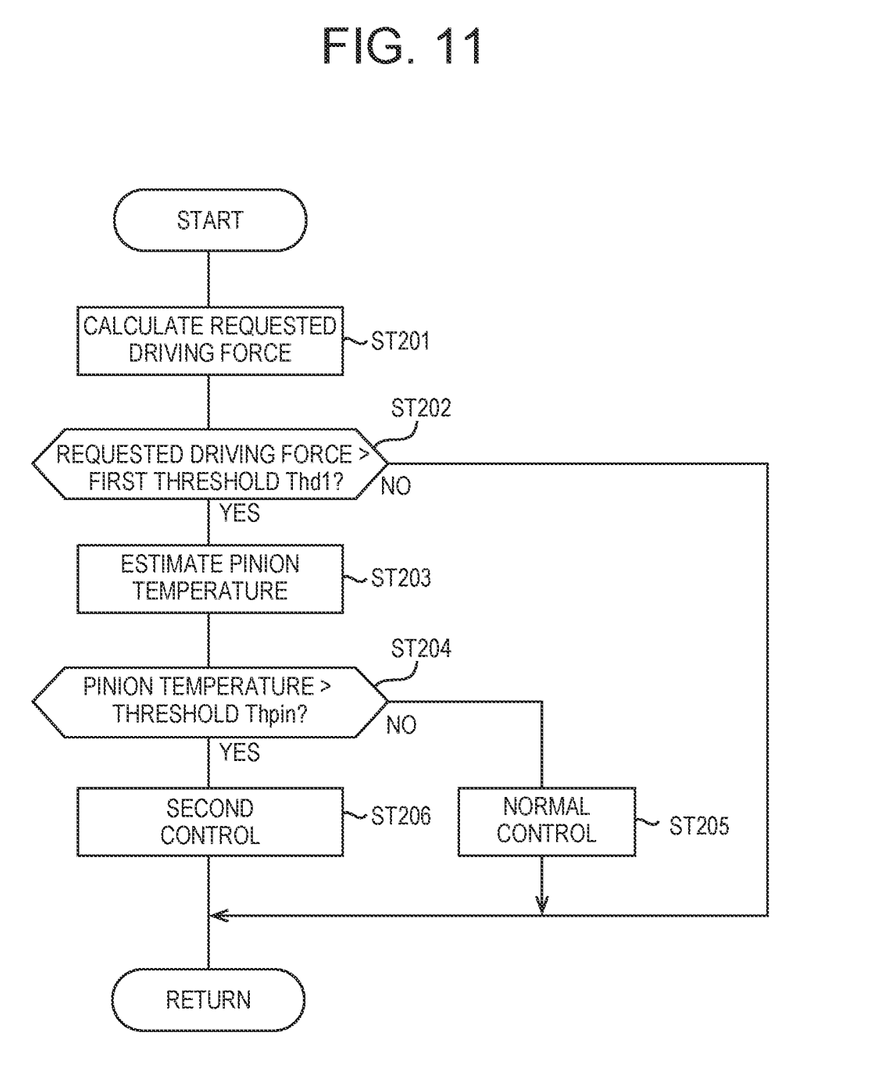
FIG. 11 is a flowchart illustrating another example of control of setting the share ratio of driving force.

A description is now given of another example of the control of setting the share ratio of the driving force, the control being executed by the ECU 100 during EV traveling with reference to the flowchart of FIG. 11. The control routine of FIG. 11 is executed in the ECU 100.

Since the contents of the processing of step ST201 to step ST204 in the control routine of FIG. 11 are basically identical to those of step ST101 to step ST104 in the control routine of FIG. 6, a detailed description thereof is omitted.

Figure 12:
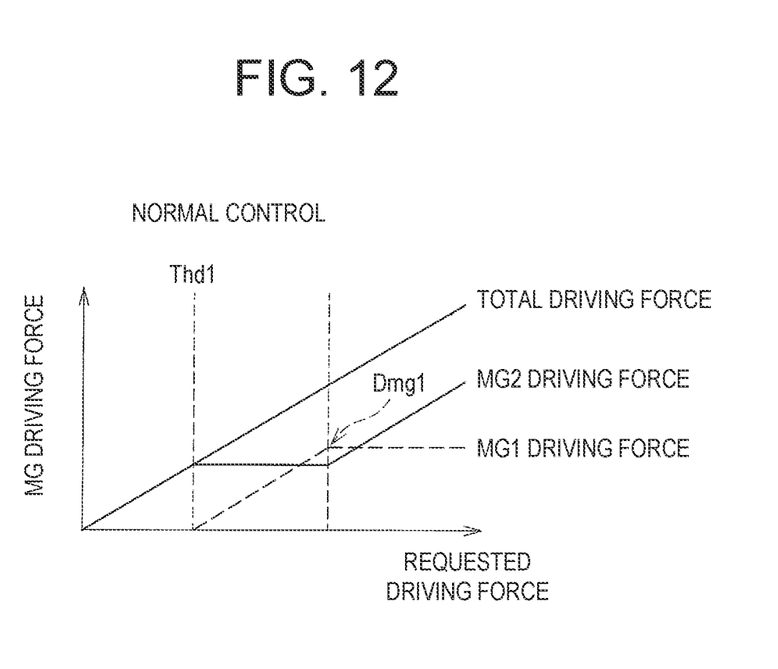
FIG. 12 illustrates a driving force share ratio between MG1 driving force and MG2 driving force in normal control.

Also in this example, when the determination result of step ST204 is negative (NO) (when pinion temperature Thpin), normal control is executed in step ST205. The normal control is basically identical to the control of step ST105. That is, as illustrated in FIG. 12, in the normal control, the share ratio of the MG1 driving force is increased from zero when the requested driving force exceeds the first threshold Thd1. The increase gradient of the MG1 driving force is set to be identical to the increase gradient of the requested driving force, and the MG2 driving force is set constant during increase in the MG1 driving force. When the MG1 driving force reaches the specified value Dmg1 (for example, the MG1 rated output line), the MG1 driving force is set constant and the share ratio of the MG2 driving force is increased in accordance with increase in the requested driving force.

Also in the normal control of this example, before the MG2 driving force becomes a maximum value, the driving mode is shifted to the dual driving by the first motor-generator MG1 and the second motor-generator MG2. Accordingly, the control flexibility of the first motor-generator MG1 and the second motor-generator MG2 is enhanced. As a result, it becomes possible to further enhance the system efficiency. It also becomes possible to execute control so as to enhance drivability and NV characteristics.

Meanwhile, when the determination result of step ST204 is positive (YES) (when the pinion temperature is higher than the threshold Thpin), second control is executed in step ST206 to set the share ratio of the driving force such that increase in the pinion temperature is suppressed. Hereinafter, the second control will be described with reference to FIG. 13.

Figure 13:
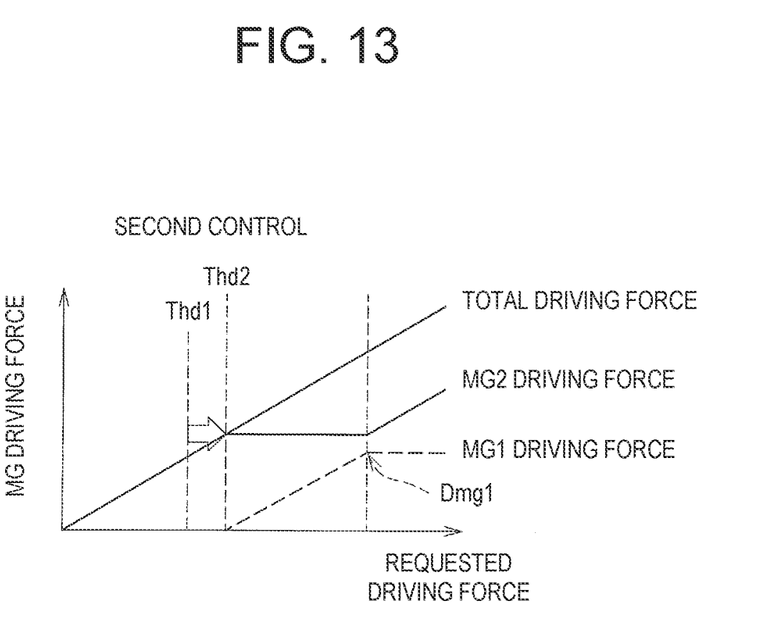
FIG. 13 illustrates a driving force share ratio between MG1 driving force and MG2 driving force in second control.

As illustrated in FIG. 13, in the second control, the share ratio of the MG1 driving force is zero even after the requested driving force exceeds the first threshold Thd1. The share ratio of MG1 driving force is increased from zero when the requested driving force exceeds the second threshold Thd2. Here, as illustrated in FIG. 7, the second threshold Thd2 (one example of "the second specified value") is a value larger than the first threshold Thd1 (first threshold Thd1<second threshold Thd2) and smaller than the maximum output (maximum driving force) of the second motor-generator MG2. The second threshold Thd2 is set in accordance with the vehicle speed. Also in the second control, when the MG1 driving force reaches the specified value Dmg1 (for example, the MG1 rated output line), the MG1 driving force is set constant and the share ratio of the MG2 driving force is increased in accordance with increase in the requested driving force.

As described in the foregoing, according to the second control of this example, when the pinion temperature (estimated temperature) is high (when the pinion temperature is higher than the threshold Thpin), the requested driving force that causes output of the MG1 driving force (the threshold of the requested driving force that causes the driving force share ratio to be switched) is set higher than the requested driving force when the pinion temperature is low (when the pinion temperature is equal to or below Thpin). That is, the range of the requested driving force that causes output of the MG1 driving force is set to be narrow. This makes it possible to suppress increase in the pinion temperature and to reduce the possibility that the dual driving by the first motor-generator MG1 and the second motor-generator MG2 is restricted (prohibited).

Furthermore, in the second control of this example, the output of the second motor-generator MG2 in the dual-driving region may have a margin as compared with the case of the first control. Accordingly, when cranking is performed with the first motor-generator MG1 at the start of the engine during EV traveling (dual-driving region), the output torque of the second motor-generator MG2 is sufficient enough as a reaction torque to the output torque of the first motor-generator MG1, so that sufficient engine startability is advantageously achieved.

Here, in setting the share ratio of the driving force in this example, a switching line between the single driving and the dual driving (a threshold for the requested driving force) is changed in accordance with the pinion temperature (first threshold Thd1 to second threshold Thd2), so that the share ratio of the driving force is switched. Therefore, the share ratio of the driving force can be set based on a simple control logic.

When step ST202 to step ST206 of FIG. 11 are executed by the ECU 100, estimation of the pinion temperature and setting of the share ratio of the driving force are executed.

As described in the foregoing, according to the present disclosure, the following effects are provided. According to the present disclosure, when the pinion temperature is low (when the pinion temperature is equal to or below the specified temperature), the driving force share ratio of the first electric motor can be increased (the load of the second electric motor can be decreased) during the dual driving. Accordingly, it becomes possible to enhance the control flexibility of the second electric motor. It also becomes possible to enhance the control flexibility of the first electric motor. When the pinion temperature is low, the pinion temperature hardly reaches an upper limit even with the torque output from the first electric motor. This makes it possible to suppress the possibility that the dual driving is limited (prohibited).

According to the present disclosure, before the driving force of the second motor-generator becomes a maximum value (when the requested driving force exceeds the first threshold that is smaller than the maximum driving force of the second motor-generator), the driving state shifts to a dual driving state in which the driving force is output not only from the second electric motor but also from the first electric motor, so that the control flexibility of the first electric motor and the second electric motor is enhanced. As a result, it becomes possible to further enhance the system efficiency. It also becomes possible to execute control so as to enhance drivability.

Here, when the driving force (torque) of the first electric motor is used, there is a possibility that the pinion temperature of the pinion gear in the planetary gear mechanism may increase and the dual driving may be prohibited. However, in the present disclosure, when the pinion temperature is high (when the pinion temperature is higher than the specified temperature), the share ratio of the driving force of the first electric motor is set to be lower than the share ratio when the pinion temperature is low (when the pinion temperature is equal to or below the specified temperature). This makes it possible to suppress increase in the pinion temperature and to reduce the possibility that the dual driving by the first electric motor and the second electric motor is restricted (prohibited).

According to the present disclosure, before the driving force of the second electric motor becomes a maximum value (when the requested driving force exceeds the first specified value that is smaller than the maximum driving force of the second electric motor), the driving state shifts to the dual driving state in which the driving force is output not only from the second electric motor but also from the first electric motor, so that the control flexibility of the first electric motor and the second electric motor are enhanced. As a result, it becomes possible to further enhance the system efficiency. It also becomes possible to execute control so as to enhance drivability.

According to the present disclosure, when the pinion temperature is high (when the pinion temperature is higher than the specified temperature), the driving force share ratio of the first electric motor is set to be increased if the requested driving force exceeds the second specified value that is larger than the first specified value. That is, the range of the requested driving force that causes output of the driving force from the first electric motor is set to be narrow. This makes it possible to suppress increase in the pinion temperature and to reduce the possibility that the dual driving by the first electric motor and the second electric motor is restricted (prohibited).

According to the present disclosure, in the vehicle including a planetary gear mechanism, a first electric motor, and a second electric motor, the vehicle being able to perform dual driving to drive both the electric motors for traveling, increase in pinion temperature of a pinion gear in the planetary gear mechanism can be suppressed in the dual driving.

It should be understood that the embodiments disclosed are in all respects illustrative and are not considered as the basis for restrictive interpretation. Therefore, the technical scope of the present disclosure is not intended to be interpreted based solely on the disclosed embodiments but is defined based on the appended claims. All changes which come within the range of the claims and meaning and the range of equivalency thereof are therefore intended to be embraced in the technical scope of the present disclosure.

For example, the control device of the present disclosure is also applicable to hybrid vehicles of other configurations, without being limited to the hybrid vehicle illustrated in FIG. 1. For example, the control device of the present disclosure is also applicable to a hybrid vehicle in which a rotating shaft of a first motor-generator MG1 and a rotating shaft of a second motor-generator MG2 are disposed on the same axis.

Although the case of the FF-type vehicle (hybrid vehicle) has been described in the above embodiments, the present disclosure is not limited thereto. The present disclosure is also applicable to vehicles of a front-engine rear-drive (FR) type and vehicles of a four-wheel-drive type.

Although the hybrid vehicle including an engine, a first electric motor (MG1), and a second electric motor (MG2) has been described in the above embodiment, the present disclosure is not limited thereto. The present disclosure is also applicable to an electric vehicle (EV vehicle) including only the first electric motor and the second electric motor.

The present disclosure is effectively utilized for control of the vehicle including a first electric motor and a second electric motor, the vehicle being able to travel with driving force of only the second electric motor and to travel with driving force of both the first electric motor and the second electric motor.

What is claimed is:

1. A control device for a vehicle, the vehicle including a planetary gear mechanism, a first electric motor, and a second electric motor,
    the planetary gear mechanism including a sun gear, a ring gear, a pinion gear, and a planetary carrier, the planetary gear mechanism being disposed in a power transmission line,
    the planetary gear mechanism being coupled with the first electric motor,
    the vehicle being configured to execute traveling with driving force of only the second electric motor and traveling with driving force of both the first electric motor and the second electric motor,
    the control device comprising an electronic control unit configured to:
        estimate pinion temperature of the pinion gear;
        switch between the traveling with the driving force of only the second electric motor and the traveling with the driving force of both the first electric motor and the second electric motor with respect to requested driving force of the vehicle; and
        set a share ratio of driving force of the first electric motor in the traveling with the driving force of both the first electric motor and the second electric motor such that the share ratio of the driving force of the first electric motor when the estimated pinion temperature is higher than a specified temperature is lower than the share ratio of the driving force of the first electric motor when the pinion temperature is equal to or below the specified temperature.

2. The control device according to claim 1, wherein the electronic control unit is configured to switch from the traveling with the driving force of only the second electric motor to the traveling with the driving force of both the first electric motor and the second electric motor when the requested driving force exceeds a first specified value, and
    the first specified value is smaller than a maximum driving force of the second electric motor.

3. A control device for a vehicle, the vehicle including a planetary gear mechanism, a first electric motor, and a second electric motor,
    the planetary gear mechanism including a sun gear, a ring gear, a pinion gear, and a planetary carrier, the planetary gear mechanism being disposed in a power transmission line,
    the planetary gear mechanism being coupled with the first electric motor,
    the vehicle being configured to execute traveling with driving force of only the second electric motor and traveling with driving force of both the first electric motor and the second electric motor,
    the control device comprising an electronic control unit configured to:

estimate pinion temperature of the pinion gear;

switch between the traveling with the driving force of only the second electric motor and the traveling with the driving force of both the first electric motor and the second electric motor with respect to requested driving force of the vehicle; and set a switching threshold of the requested driving force of the vehicle, at which the traveling with the driving force of only the second electric motor is switched to the traveling with the driving force of both the first electric motor and the second electric motor such that the switching threshold when the estimated pinion temperature is higher than a specified temperature is higher than the switching threshold when the pinion temperature is equal to or below the specified temperature.

4. The control device according to claim 3, wherein the electronic control unit is configured to set the switching threshold to a first specified value when the estimated pinion temperature is equal to or below the specified temperature, and the traveling with the driving force of only the second electric motor is switched to the traveling with the driving force of both the first electric motor and the second electric motor when the requested driving force exceeds the first specified value, the electronic control unit is configured to set the switching threshold to a second specified value when the estimated pinion temperature is higher than the specified temperature, and the traveling with the driving force of only the second electric motor is switched to the traveling with the driving force of both the first electric motor and the second electric motor when the requested driving force exceeds the second specified value, the second specified value is larger than the first specified value, and the first specified value and the second specified value are smaller than a maximum driving force of the second electric motor.

5. A control method for a vehicle, the vehicle including a planetary gear mechanism, a first electric motor, a second electric motor, and an electronic control unit, the planetary gear mechanism including a sun gear, a ring gear, a pinion gear, and a planetary carrier, the planetary gear mechanism being disposed in a power transmission line, the planetary gear mechanism being coupled with the first electric motor, the vehicle being configured to execute traveling with driving force of only the second electric motor and traveling with driving force of both the first electric motor and the second electric motor, the control method comprising:

estimating, by the electronic control unit, pinion temperature of the pinion gear;

switching, by the electronic control unit, between the traveling with the driving force of only the second electric motor and the traveling with the driving force of both the first electric motor and the second electric motor with respect to requested driving force of the vehicle; and setting, by the electronic control unit, a share ratio of driving force of the first electric motor in the traveling with the driving force of both the first electric motor and the second electric motor such that the share ratio of the driving force of the first motor when the estimated pinion temperature is higher than a specified temperature is lower than the share ratio of the driving force of the first motor when the pinion temperature is equal to or below the specified temperature.

6. A control method for a vehicle, the vehicle including a planetary gear mechanism, a first electric motor, a second electric motor, and an electronic control unit, the planetary gear mechanism including a sun gear, a ring gear, a pinion gear, and a planetary carrier, the planetary gear mechanism being disposed in a power transmission line, the planetary gear mechanism being coupled with the first electric motor, the vehicle being configured to execute traveling with driving force of only the second electric motor and traveling with driving force of both the first electric motor and the second electric motor, the control method comprising:

estimating, by the electronic control unit, pinion temperature of the pinion gear;

switching, by the electronic control unit, between the traveling with the driving force of only the second electric motor and the traveling with the driving force of both the first electric motor and the second electric motor; and setting, by the electronic control unit, a switching threshold of the requested driving force of the vehicle, at which the traveling with the driving force of only the second electric motor is switched to the traveling with the driving force of both the first electric motor and the second electric motor such that the switching threshold when the estimated pinion temperature is higher than a specified temperature is higher than the switching threshold when the pinion temperature is equal to or below the specified temperature.

* * * * *